Patented May 13, 1947

2,420,489

UNITED STATES PATENT OFFICE 2,420,489

STEROIDAL HORMONE INTERMEDIATES AND PREPARATION OF THE SAME

Russell Earl Marker, Mexico City, Mexico, assignor to Parke, Davis & Company, Detroit, Mich., a corporation of Michigan No Drawing. Original application May 15, 1941, Serial No. 393,667. Divided and this application May 24, 1944, Serial No. 537,193

8 Claims. (Cl. 260—397.3)

This invention relates to steroidal hormone intermediates and preparation of the same, and, more particularly, to the preparation of new steroidal sapogenin derivatives useful as intermediates for the manufacture of hormones.

This application is a division of my copending application, Serial No. 393,667, filed May 15, 1941, now Patent No. 2,352,852, issued July 4, 1944.

One of the objects of this invention is to prepare new steroidal sapogenin derivatives which can readily be converted into hormones such as those having progestational and cortical activity.

In my copending application, Serial No. 393,668, filed May 15, 1941 (now Patent No. 2,291,643, issued August 4, 1942) I have disclosed and claimed a certain group of $\Delta^{16}$-20-keto-pregnene compounds which are easily prepared from the readily available sarsasapogenin.

In my application, Serial No. 317,419, filed February 5, 1940, now Patent No. 2,352,848, issued July 4, 1944, I have disclosed and claimed another valuable group of $\Delta^{16}$-20-keto-pregnene compounds having at $C_3$ and at one of $C_2$ and $C_6$, a member of the class consisting of —OH and groups hydrolyzable to —OH.

In my application, Serial No. 382,451, filed March 8, 1941, now Patent No. 2,352,850, issued July 4, 1944, I have disclosed and claimed sapogenin derivatives such as pseudo-diosgenin and pseudo-$\Delta^4$-tigogenenone.

The invention in the instant divisional application relates more particularly to the preparation of pseudo-$\Delta^4$-tigogenenone, its oxidation to $\Delta^{4,16}$-pregnadienedione-3,20 and the conversion of the latter to the therapeutically important progesterone.

In my parent application, Serial No. 393,667, filed May 15, 1941, I have set forth the preparation of new sapogenin derivatives which I designate as pseudo-sapogenins and have also set forth the manner in which the pseudo-sapogenins may be oxidized to form $\Delta^{16}$-20-keto-pregnene compounds, i. e. steroids having in ring D the structure

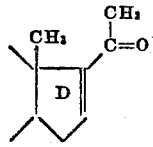

I have shown that the pseudo-sapogenins, on mild oxidation, e. g. at room temperature, with chromic anhydride in acetic acid, yield mostly $\Delta^{16}$-unsaturated-20-keto-pregnane derivatives, together with a smaller amount of the etiobilianic acid derivative.

I have also shown that the most satisfactory yields of the $\Delta^{16}$-20-keto-pregnene compounds are obtained by conducting the oxidation below 50° C. with an oxidizing agent selected from the class consisting of permanganic and chromic acids and their salts. Particularly satisfactory results are obtained if the oxidation is conducted in acetic acid solution at 20–35° C. using chromic anhydride as the oxidant.

The invention is illustrated by the following example:

Example (a) To a solution of 10 g. of diosgenin in a mixture of 500 cc. of dry toluene and 75 cc. of cyclohexanone is added 25 g. of aluminum isopropylate. After refluxing for ten hours, water and ether are added and the etheral solution is washed well with dilute hydrochloric acid, and then with dilute sodium hydroxide. The ether is evaporated and the residue is steam distilled to remove cyclohexanone and its condensation products. The residual liquor is extracted with ether, and the ether evaporated to leave a residue which is crystallized first from pentane and then from ether-pentane, giving $\Delta^4$-tigogenenone of M. P. 186–188° C.

(b) A mixture of 6 g. of $\Delta^4$-tigogenenone and 25 cc. of acetic anhydride is heated in a bomb tube at 200° C. for ten hours. The excess acetic anhydride is removed in vacuo and the residue is heated for thirty minutes on a steam-bath with 500 cc. of a 1% alcoholic potassium hydroxide solution. Water is added and the product is extracted with ether. The ether is treated with Norit and evaporated, leaving a yellow oil, pseudo-$\Delta^4$-tigogenenone. This does not crystallize from the usual solvents, including aqueous solvents or ether-pentane.

A solution of 300 mg. of the oily pseudo-$\Delta^4$-tigogenenone in 10 cc. of methanol and 1 cc. of concentrated hydrochloric acid is refluxed for thirty minutes. Water is added and the product is extracted with ether, treated with Norit, and the solvent evaporated. The residue readily crystallizes from ether-pentane to give a pseudo-$\Delta^4$-tigogenenone product having M. P. 186–188° C.

(c) To a solution of 4 g. of the oily pseudo-$\Delta^4$-tigogenenone in 200 cc. of glacial acetic acid is added 50 cc. of a 90% solution of glacial acetic acid containing 4 g. of chromic anhydride. The temperature is kept at 25–28° C. for ninety minutes. Water is added and the product is extracted with ether and washed free of acids with water and dilute sodium carbonate solution. After removal of the ether, the residue is sublimed in a high vacuum at 130–133° C. The sublimate is crystallized from ether-pentane and from ether to a constant melting point of 182–185° C. The product is $\Delta^{4,16}$-pregnadienedione-3,20.

(d) A solution of 1 g. of $\Delta^{4,16}$-pregnadienedione-3,20 in 100 cc. of ether is added to 500 mg. of palladium-barium sulfate catalyst, and the mixture is shaken with hydrogen at room temperature under a pressure of five pounds for twenty minutes. The solution is filtered and the ether is evaporated. The residue is dissolved in 20 cc. of 60% acetone and allowed to stand at 0° C. overnight. The material which precipitates out is filtered off and the filtrate is extracted with ether. The ether is removed and the residue repeatedly crystallized from pentane and dilute acetone to give progesterone of M. P. 128° C.

Instead of using a palladium-barium sulfate catalyst, the reduction to progesterone may be obtained by means of zinc and a lower fatty acid such as acetic acid.

What I claim as my invention is:

1. The process for preparing $\Delta^{4,16}$-pregnadienedione-3,20 which comprises treating pseudo $\Delta^4$-tigogenenone with an oxidizing agent selected from the class consisting of permanganic acid, chromic acid and their salts at a temperature below 50° C.

2. The process for preparing $\Delta^{4,16}$-pregnadienedione-3,20 which comprises treating pseudo $\Delta^4$-tigogenenone with chromic anhydride in acetic acid solution at a temperature about 20–35° C.

3. In the process for manufacturing progesterone, the step of reducing $\Delta^{4,16}$-pregnadienedione-3,20 with a reagent of the class consisting of hydrogen and a palladium catalyst, and zinc and a lower fatty acid.

4. In the process for manufacturing progesterone, the step of hydrogenating $\Delta^{4,16}$-pregnadienedione-3,20 in the presence of a palladium-barium sulfate catalyst.

5. The process for manufacturing progesterone comprising treating pseudo-$\Delta^4$-tigogenenone with an oxidizing agent selected from the class consisting of permanganic acid, chromic acid and their salts at a temperature below 50° C. and hydrogenating the $\Delta^{4,16}$-pregnadienedione-3,20 thereby obtained in the presence of a palladium-barium sulfate catalyst.

6. The process for preparing $\Delta^{4,16}$-pregnadienedione-3,20 which comprises subjecting pseudo-$\Delta^4$-tigogenenone to mild oxidation at a temperature below 50° C.

7. The process for manufacturing progesterone comprising subjecting pseudo-$\Delta^4$-tigogenenone to mild oxidation at a temperature below 50° C. thereby obtaining $\Delta^{4,16}$-pregnadienedione-3,20 and reducing the latter with a reagent of the class consisting of hydrogen and a palladium catalyst, and zinc and a lower fatty acid to obtain progesterone.

8. The process for manufacturing progesterone comprising subjecting pseudo-$\Delta^4$-tigogenenone to mild oxidation at a temperature below 50° C. and hydrogenating the $\Delta^{4,16}$-pregnadienedione-3,20 thereby obtained in the presence of a palladium-barium sulfate catalyst.

RUSSELL EARL MARKER.